(12) United States Patent
Park

(10) Patent No.: US 10,791,871 B2
(45) Date of Patent: *Oct. 6, 2020

(54) TRAVEL MUG FOR MICROWAVE OVEN

(71) Applicant: Jong Peter Park, Pasadena, CA (US)

(72) Inventor: Jong Peter Park, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,720

(22) Filed: Mar. 17, 2014

(65) Prior Publication Data

US 2015/0259124 A1   Sep. 17, 2015

(51) Int. Cl.
*H05B 6/64*        (2006.01)
*A47J 36/02*       (2006.01)
*A47G 19/22*       (2006.01)

(52) U.S. Cl.
CPC ........ *A47J 36/027* (2013.01); *A47G 19/2288* (2013.01)

(58) Field of Classification Search
CPC ....... H05B 6/6494; H05B 6/6408; H05B 6/64
USPC .......... 99/337, 403, 342; 219/439, 538, 621, 219/620, 725, 730, 732
See application file for complete search history.

(56) References Cited

U.S. PATENT DOCUMENTS

| | | |
|---|---|---|
| 1,681,150 A | 8/1928 | Vischer, Jr. |
| 2,441,131 A | 5/1948 | MacBlackman et al. |
| 2,622,591 A | 12/1952 | Bramberry, Jr. |
| 2,876,634 A | 3/1959 | Zimmerman et al. |
| 2,933,586 A | 4/1960 | Schusterius |
| 3,463,140 A | 8/1969 | Rollor, Jr. |
| 3,489,075 A | 1/1970 | O'Reilly |
| 3,547,298 A | 12/1970 | Versluis |
| 3,701,872 A | 10/1972 | Levinson |
| 3,721,363 A | 3/1973 | Bressler et al. |
| 3,731,037 A | 5/1973 | Levinson |
| 3,777,099 A | 12/1973 | Levinson |
| 3,941,967 A * | 3/1976 | Sumi ................... H05B 6/6494 219/729 |
| 4,106,486 A | 8/1978 | Lee |

(Continued)

FOREIGN PATENT DOCUMENTS

| | | |
|---|---|---|
| CA | 2305827 A1 * | 10/2000 |
| CN | 201002790 Y | 1/2008 |

(Continued)

OTHER PUBLICATIONS

The International Search Report and the Written Opinion of the International Searching Authority, dated Jan. 22, 2016.

(Continued)

*Primary Examiner* — Lorne E Meade
*Assistant Examiner* — Ayub A Maye

(57) ABSTRACT

A vessel that is made of metal materials and can be used for microwave oven, including a container having a double-layered structure with an inner shell and an outer shell. The inner shell and said outer shell are joined by a joint in such a way that a cavity is provided therebetween, and a heat transfer medium is filled to at least part of said cavity. A microwave-heating plate is provided between the inner and outer shells and the microwave-heating plate comprises a MnZn-Ferrite-rubber fuse-compounded thereto. A thermochromic paint is disposed on one side of said outer shell. A pressure release device is provided at one side of said outer shell.

9 Claims, 8 Drawing Sheets

(56) References Cited

U.S. PATENT DOCUMENTS

| | | | |
|---|---|---|---|
| 4,156,365 A | 5/1979 | Heinmets et al. | |
| 4,402,195 A | 9/1983 | Campbell | |
| 4,496,815 A | 1/1985 | Jorgensen | |
| 4,629,866 A * | 12/1986 | Proctor | A47J 27/002 126/378.1 |
| 4,648,382 A | 3/1987 | Greenbacker | |
| 4,663,506 A * | 5/1987 | Bowen | A47J 36/027 219/730 |
| 4,952,765 A | 8/1990 | Toyosawa | |
| 4,994,649 A * | 2/1991 | Roland, Sr. | A47G 19/12 219/432 |
| 5,088,179 A | 2/1992 | Gibbon | |
| 5,135,132 A | 8/1992 | Potochnik | |
| 5,169,016 A | 12/1992 | Hinz, Jr. | |
| 5,209,957 A | 5/1993 | Lin | |
| 5,229,563 A * | 7/1993 | Isogai | A47J 27/088 219/686 |
| RE34,473 E * | 12/1993 | Ryan | A47J 27/21008 99/285 |
| 5,277,326 A | 1/1994 | Chiba | |
| 5,280,150 A * | 1/1994 | Arai | A21B 2/00 219/726 |
| 5,357,014 A | 10/1994 | Uchida et al. | |
| 5,508,498 A * | 4/1996 | Rheinish | A47G 21/02 219/730 |
| 5,515,995 A * | 5/1996 | Allen | A47G 19/2261 215/13.1 |
| 5,519,196 A | 5/1996 | Xu | |
| 5,520,103 A | 5/1996 | Zielinski et al. | |
| 5,918,761 A | 7/1999 | Wissinger | |
| 5,968,618 A | 10/1999 | Miller | |
| 6,191,393 B1 | 2/2001 | Park | |
| 6,320,166 B1 * | 11/2001 | Park | A47J 27/002 219/428 |
| 6,386,431 B1 | 5/2002 | Lin | |
| 6,467,645 B2 | 10/2002 | Park | |
| 6,631,824 B2 * | 10/2003 | Park | A47J 27/09 220/573.1 |
| 6,672,595 B2 | 1/2004 | Park | |
| D487,212 S | 3/2004 | Park | |
| 6,698,337 B1 | 3/2004 | Park | |
| 6,755,319 B2 | 6/2004 | Park | |
| 6,802,438 B2 | 10/2004 | Thompson | |
| 7,086,326 B2 | 8/2006 | Yokoyama | |
| 7,104,413 B2 * | 9/2006 | Liu | A47J 41/0055 215/12.1 |
| 7,216,413 B2 | 5/2007 | Cheng et al. | |
| 7,736,543 B2 | 6/2010 | Avakian | |
| 8,387,820 B2 | 3/2013 | Park | |
| 8,393,262 B1 | 3/2013 | Molayem | |
| 8,689,680 B2 | 4/2014 | Park | |
| 9,119,233 B2 | 8/2015 | Park | |
| 2003/0041741 A1 | 3/2003 | Park | |
| 2003/0102320 A1 * | 6/2003 | Park | A47J 27/002 220/756 |
| 2003/0209154 A1 * | 11/2003 | Park | A47J 36/02 99/403 |
| 2003/0209551 A1 | 11/2003 | Park | |
| 2004/0118838 A1 * | 6/2004 | Park | A47J 36/027 219/725 |
| 2004/0232144 A1 | 11/2004 | Edmark | |
| 2005/0067403 A1 | 3/2005 | Yagnik et al. | |
| 2005/0098565 A1 | 5/2005 | Liu | |
| 2005/0205577 A1 | 9/2005 | Park | |
| 2005/0263015 A1 | 12/2005 | Mulgrew | |
| 2006/0081639 A1 * | 4/2006 | Lazaroff | A47J 27/212 220/573.1 |
| 2006/0219712 A1 | 10/2006 | Ramirez | |
| 2006/0289538 A1 | 12/2006 | Hasegawa | |
| 2007/0000915 A1 | 1/2007 | Cheng | |
| 2007/0029316 A1 | 2/2007 | Fernandez | |
| 2009/0108029 A1 | 4/2009 | Fromm | |
| 2010/0199860 A1 | 8/2010 | Seitz et al. | |
| 2012/0024845 A1 * | 2/2012 | Lee | C03C 8/02 219/725 |
| 2012/0080439 A1 * | 4/2012 | Park | A47G 19/2288 220/710.5 |
| 2014/0102315 A1 | 4/2014 | Park | |
| 2014/0138375 A1 | 5/2014 | Park | |
| 2014/0174428 A1 | 6/2014 | Farone et al. | |
| 2014/0238250 A1 | 8/2014 | Gephart et al. | |
| 2014/0326733 A1 | 11/2014 | Park | |
| 2015/0153049 A1 | 6/2015 | Jacob et al. | |
| 2015/0259124 A1 | 9/2015 | Park | |

FOREIGN PATENT DOCUMENTS

| | | |
|---|---|---|
| CN | 201665359 U | 12/2010 |
| CN | 202229241 U | 5/2012 |
| DE | 19544717 A1 | 6/1997 |
| JP | 2000023828 A | 1/2000 |
| JP | 2004241177 A | 8/2004 |
| KR | 2003465230000 | 4/2004 |

OTHER PUBLICATIONS

Portions of prosecution history of commonly owned U.S. Appl. No. 13/681,071, now issued as U.S. Pat. No. 9,119,233, including Responses dated Mar. 10, 2015 and dated Nov. 27, 2014, and Office Actions dated Feb. 6, 2015 and dated Aug. 28, 2014.

Portions of prosecution history of commonly owned U.S. Appl. No. 13/875,553, now published as U.S. Patent Application Publication 20140326733, including Responses dated Oct. 10, 2016 and dated Apr. 6, 2016, and Office Actions dated Jun. 9, 2016 and dated Jan. 12, 2016.

Portions of prosecution history of commonly owned U.S. Appl. No. 14/135,194, now published as U.S. Patent Application Publication 20140102315, including a Response dated Aug. 1, 2016 and an Office Action dated May 18, 2016.

Portions of prosecution history of commonly owned U.S. Appl. No. 12/938,681, now issued as U.S. Pat No. 8,387,820, including a Response dated Oct. 31, 2012 and an Office Action dated Aug. 1, 2012.

* cited by examiner

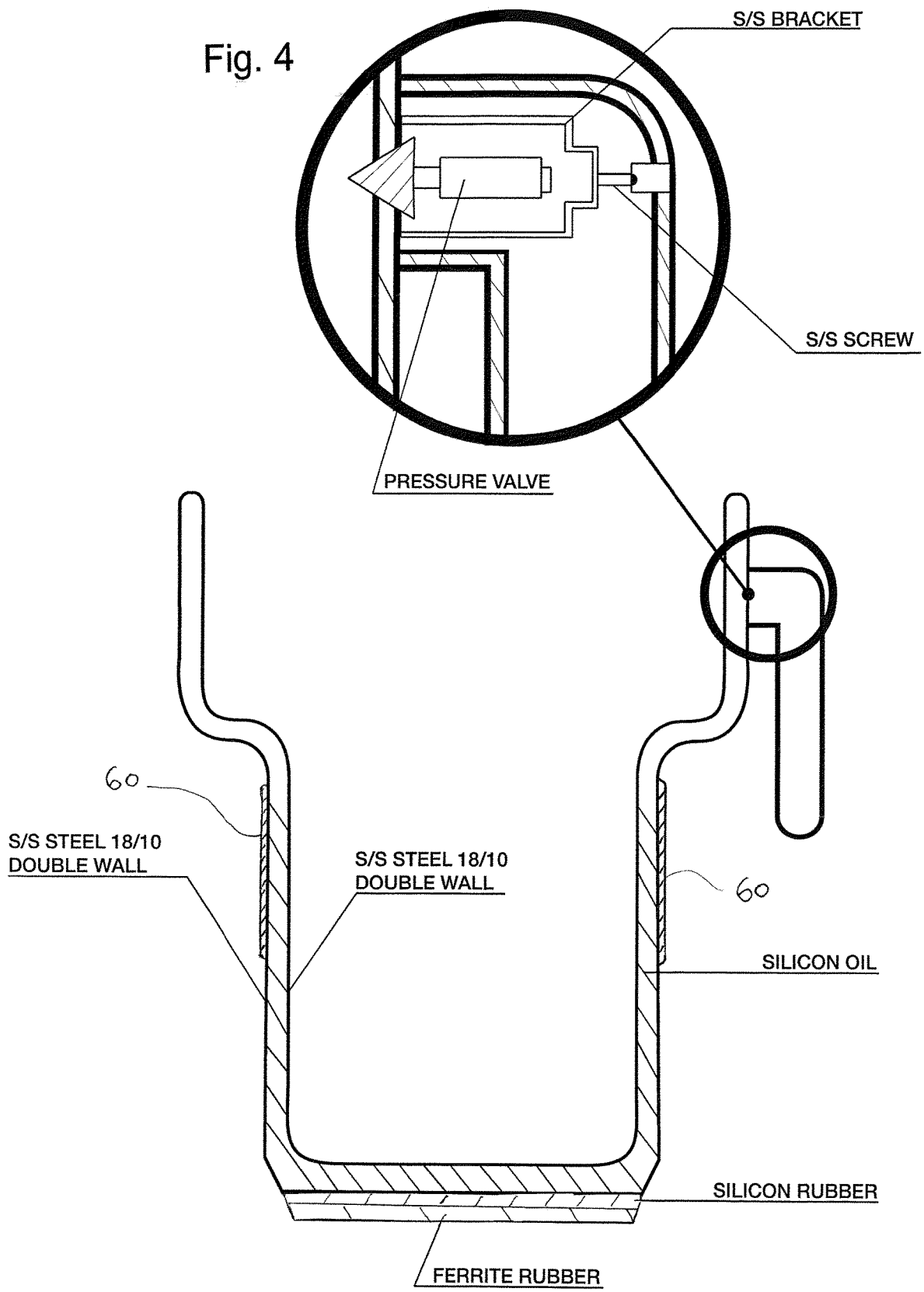

TRAVEL MUG FOR MICROWAVE OVEN

RELATED APPLICATION

This application is a continuation-in-part of U.S. patent application Ser. No. 13/681,071 for "Travel Mug for Microwave Oven" filed on Nov. 19, 2012.

TECHNICAL FIELD

The present invention relates to a travel mug for microwave oven, and more particularly, to a travel mug that is made of metal materials and can be used in a microwave oven.

BACKGROUND OF THE INVENTION

Typical containers used in a microwave oven are made of materials that electromagnetic waves can pass, and the materials may be, for example, glass, ceramic, resin, etc.

Materials such as metal that blocks the passing of electromagnetic waves cannot be used in a microwave oven.

However, containers made of metal are very effective for cooking food, not just for simply defrosting food.

A cooking bowl made of resin, not metal, is disclosed in Korean Patent Laid-Open No. 10-2005-0115981. This application relates to a cooking bowl for the microwave oven range, and teaches a cooking bowl with an electric wave absorber, which is formed on a lower part, in a bowl made of resin having heat resistance.

Further, as examples for cooking food in a container made of metal, US Patent Publication No. US2004/0094544 teaches a cooking vessel for heating water by the heat of the lower part of a container, which is located on the lower surface and made of a microwave permeable material, in a structure where a metal lid blocks microwaves, and US Patent Publication No. US2004/0118838 was filed and published in the name of the applicant of the present application, and teaches a vessel for cooking food by using a heating element that is made of ferrite rubber on the lower surface of the vessel made of a heat conductive material.

Meanwhile, such metal bowls have been used to cook food, but a metal travel mug has not been used yet for microwave oven because the material is made of metal such as stainless steel, and when food within the mug gets cold, the mug cannot be used to warm the food up using microwave oven.

Since the size of a mug for microwave oven is very small compared to typical cooking containers, a structure that can be used for microwave oven cannot be made with conventional techniques for cooking containers.

SUMMARY OF THE INVENTION

The present invention contrives to solve the disadvantages of the prior art.

The present invention is designed to solve the above problem, and aims to provide a travel mug for microwave oven that can be used for heating and cooking food within the mug fast and keep it warm for a long time.

An aspect of the invention provides a travel mug for microwave oven.

The travel mug for microwave oven comprises a container, a microwave-heating plate, a thermonchromic paint, and a pressure release device.

The container has a double-layered structure with an inner shell and an outer shell, and said inner shell and said outer shell are joined by a joint in such a way that a cavity is provided therebetween, and a heat transfer medium is filled to at least part of said cavity.

The microwave-heating plate is disposed between the inner and outer shells for converting microwave to heat, and the microwave-heating plate comprises a MnZn-Ferrite-rubber fuse-compounded thereto.

The thermochromic paint is disposed on an outer surface of the container and configured for showing temperature of inside of the container in terms of color.

The pressure release device is formed at one side of said outer shell.

The microwave-heating plate may further comprise a high tempered glass plate.

The microwave-heating plate may further comprise a ceramic plate.

The microwave-heating plate may be attached to each of the inner and outer shells by a fastening means.

The microwave-heating plate may be inserted between the inner and outer shells by a fastening means.

Each of the inner and outer shells may comprise stainless steel.

The microwave-heating material may comprise a ceramic plate, wherein the ceramic plate has a thickness from about 2 mm to about 10 mm.

The ceramic plate may have a thickness of about 5 mm.

The travel mug may be adapted to heat up a content therein in a microwave oven.

The travel mug may be adapted to heat up a content therein on a stove top or induction cooker.

The microwave-heating plate may be attached to an outer surface of the outer shell.

The inner and outer shells may be welded seamlessly, rolled, and formed bead-edge structure.

The thermochromic paint may be configured to change the color thereof to red when it is above about 80 degrees in Celsius inside the travel mug, yellow when it is between about 60 degrees and about 80 degrees, and blue when it is below about 40 degrees.

The travel mug for microwave oven may further comprises a handle formed on one side of said outer shell and a lid having a receiver part forming a concave portion to receive said joint.

The pressure release device may be installed inside a handle on one side of the outer shell and opened when a cavity pressure exceeds a predetermined value, and the pressure release device comprises:

a spring housing defining a spring device hole and a pressure controlling hole connected thereto, wherein the spring housing has a groove around the outer circumference thereof;

a pressure control valve in the spring device hole to block the pressure controlling hole;

a spring placed in the spring housing to bias the pressure control valve against the pressure controlling hole; and a spring suspension member having a through hole and coupled with the spring housing with a step ring being placed in the groove of the spring housing.

The heat transfer medium may be silicon oil.

The pressure release device may be installed inside a handle on one side of the outer shell and comprises a bracket fixedly installed with a fixing part at one side of the handle, and a valve member installed within the bracket, wherein said valve member comprises a body being hollow and cylindrical, a neck, being hollow and cylindrical, with the smallest outer diameter and with its length being the same as the thickness of the outer shell, and a head being tapered forwardly, said neck being inserted into an opening formed on the outer shell.

The travel mug for microwave oven may further comprise a silicon rubber plate disposed between the microwave-heating plate and the outer bottom surface of the outer shell.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 4 shows a cross-sectional view of a travel mug for microwave oven according to another embodiment of the present invention;

DETAILED DESCRIPTION EMBODIMENTS OF THE INVENTION

All the contents of U.S. Pat. No. 6,320,166 issued on Nov. 20, 2001, U.S. Pat. No. 6,191,393 issued on Dec. 2, 2001, U.S. Pat. No. 6,467,645 issued Oct. 22, 2002, U.S. Pat. No. 6,631,824 issued on Oct. 14, 2003, U.S. Pat. No. 6,698,337 issued on Mar. 2, 2004, US Design Pat. No. 486,352 issued on Feb. 10, 2004, US Design Pat. No. 487,212 issued on Mar. 2, 2004, Korean Patent Publication No. 10-2005-0115981, US Patent Publication No. 2004/0094544, US Patent Publication No. 2004/0118838, and US Patent Publication No. 2012/0080439 are incorporated herein by reference.

Hereinafter, the present invention will be described in detail with reference to the drawings.

Figure 1:
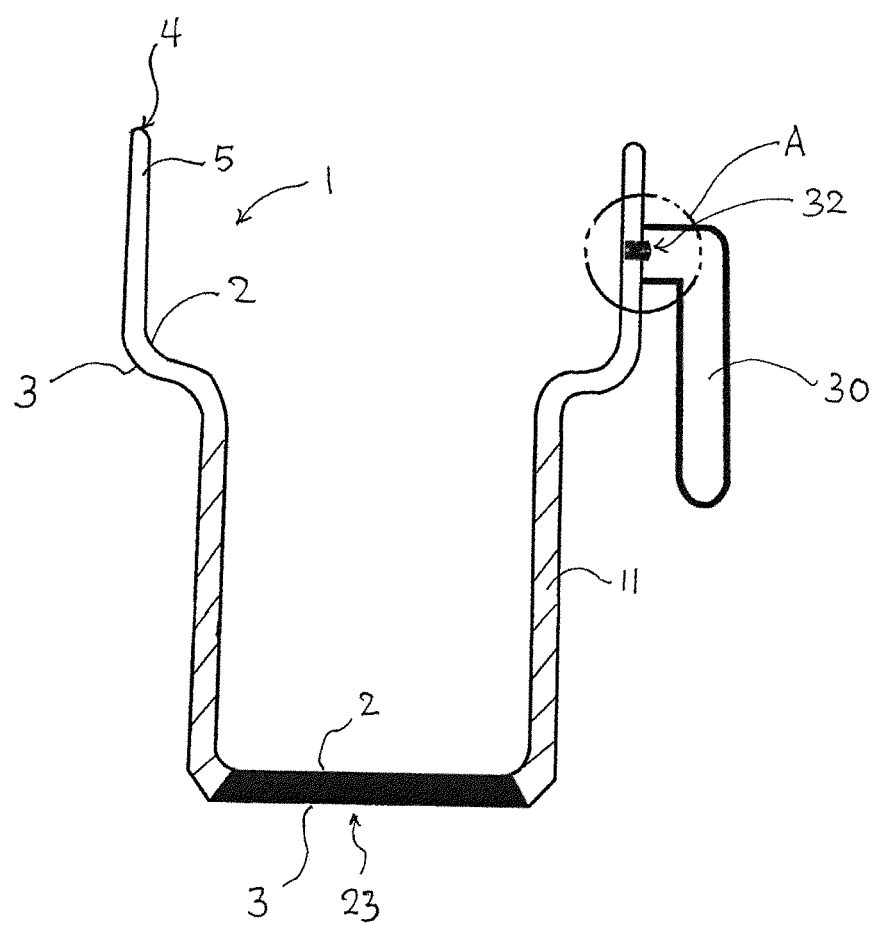
FIG. 1. shows a cross-sectional view of a travel mug for microwave oven according to the present invention.

FIG. 1. shows a cross-sectional view of a vessel for microwave oven according to the present invention.

A container (1) of the vessel according to the present invention has a double-layered structure with an inner shell (2), an outer shell (3), and a microwave heating plate (23), and the inner shell (2) and the outer shell (3) are joined by a joint (4) of the upper part of the container (1) of the vessel to seal a cavity (5).

The inner shell (2) and outer shell (3) are preferably made of stainless steel, and a joint (4) may be made by electronic welding.

A heat transfer medium (11) is provided within at least part of the cavity (5) of the container (1).

The heat transfer medium (11) is preferably silicon oil.

Since silicon oil has an advantage for maintaining a melting point of −25° C. and a boiling point of 200° C., a heat preserving rate of 70% or more can be maintained after four hours have been passed.

The microwave-heating plate (23) is disposed between the inner and outer shells (2, 3) of the container (1) for converting microwave to heat as shown in FIG. 1.

The microwave-heating plate (23) may comprise a ceramic plate or a high tempered glass plate, but it is not limited to it if it can covert microwave to thermal energy.

The microwave-heating plate (23) may be attached to each of the inner or outer shell (2, 3) by a fastening means. The fastening means may be provided by a welding.

The microwave-heating plate may be fixed in place just by bing inserted between the inner and outer shells by a fastening means. For example, the microwave-heating plate (23) may be disposed and held in place by the inner and outer shells (2, 3), even without any further fastening means.

Each of the inner and outer shells may comprise stainless steel.

The microwave-heating material may comprise a ceramic plate, and the ceramic plate may have a thickness from about 2 mm to about 10 mm. Preferably, the ceramic plate has a thickness of about 5 mm.

According to the present invention, a vessel for microwave oven can be easily used for microwave oven.

When the vessel for microwave oven according to the present invention is put in a microwave oven and heated, the microwave heating plate (23) absorbs high-frequency energy, converts it into heat energy, and transfers the heat energy to the inner or outer shell (2, 3) to heat the heat transfer medium (11) in the cavity (5) of the container (1), thereby heating the food in the vessel for microwave oven.

A handle (30) installed on the external circumference of the container (1) of the vessel is made of silicon materials so as to prevent the handle from being heated and slippery.

A discharge hole (32) is formed at a proper location on a side of the handle (30).

Referring to FIG. 1, the pressure release device (A), which is connected to the container (1) through a clamping hole (1b), includes a spring housing (6) which is affixed to the outer shell (3) of the container (1). According to one embodiment of the present invention, the spring housing (6) has a shape of a screw or bolt which is securely affixed to the outer shell (3) using a fastening nut (7). The spring housing (6) defines an elongated spring device hole (6a) at one end and a pressure controlling hole (6b) at opposite end, thus sharing the same center axis. On the outer circumference the spring housing (6) that defines the spring device hole (6a), there provide are threads (6c) for receiving a spring suspension member (10). At the other end of the spring housing (6), a screw head (6d) is formed to abut against the inner surface of the outer shell (3). Preferably, a washer or packing (12) may be provided between the screw head (6d) and the outer shell (3) to secure the sealing thereof.

Figure 2:
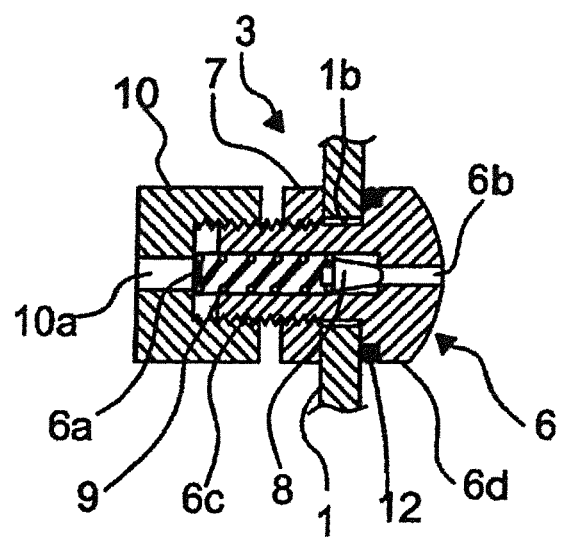
FIG. 2 shows a detailed view of a pressure release device according to the present invention.

Referring to FIG. 2, in the spring device hole (6a), a pressure control valve (8) made of heat-resistant rubber or other suitable material is inserted. The pressure control valve (8) preferably comprises a needle valve. A spring (9) is placed in the rear of the pressure control valve (8) and the spring suspension member (10) is coupled to the spring housing (6).

The spring (9) biases the pressure control valve 8 against the pressure controlling hole (6b) to substantially block the same. The spring suspension member (10) has inner threads matching that of the outer threads (6c) of the spring housing (6) to fastened thereto. Thus, any excess pressure generated from the cavity (5) is released through the pressure release device (A) by elastic movement of the pressure control valve (8). When sufficient pressure is created in the cavity (5), the pressure control valve (8) is pushed back by the pressure and the pressure is relieved through the pressure controlling hole (6a), the spring device hole (6a) and the orifice (10a) defined by the spring suspension member (10).

Hereinafter, a lid of the vessel according to the present invention will be described.

Figure 3A:
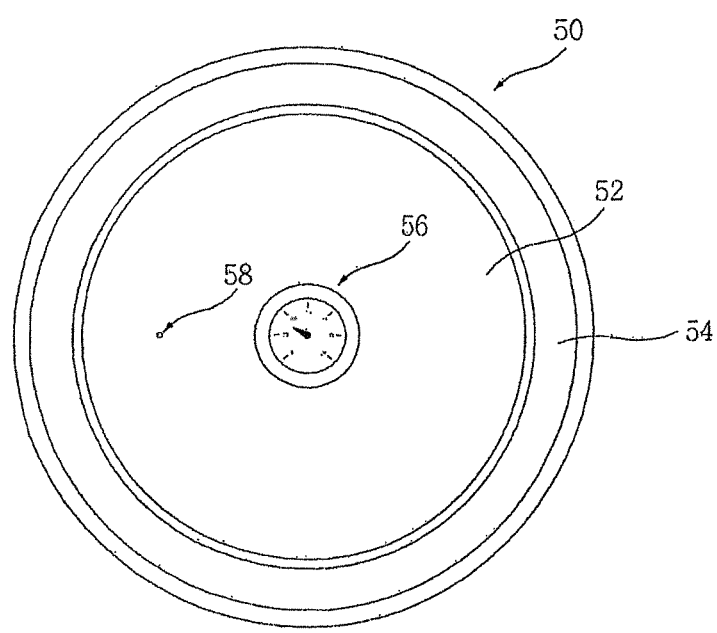
FIG. 3a shows a plane view of a lid of the travel mug for microwave oven according to the present invention.
Figure 3B:
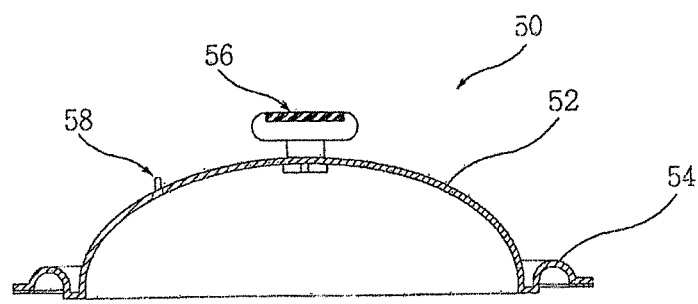
FIG. 3b shows a cross-sectional view of the lid of the travel mug for microwave oven according to the present invention.

FIG. 3a shows a plane view of a lid of the vessel, and FIG. 3b shows a cross-sectional view of the lid of the vessel.

The lid body (52) of a lid (50) of the vessel is in a dome-shaped form, and comprises a receiver part (54) constituting a concave portion around the edge to receive a joint (4) of the vessel.

The lid body (52) is preferably made of silicon rubber. On the upper surface of the lid body (52), a timer (56) may be installed, and a discharge hole (58) is formed on a proper location.

The vessel for microwave oven according to the present invention is effective and economic because it enables office workers who are busy in business to cook rice porridge, soup, or rice as breakfast or lunch in an office.

In addition, since the effect of cooling is the same, the vessel can be used for keeping food cold for a long time.

In certain embodiments of the invention, each of the inner and outer shells may comprise stainless steel.

The microwave-heating material may comprise a ceramic plate, and the ceramic plate may have a thickness from about 2 mm to about 10 mm. Preferably, the ceramic plate has a thickness of about 5 mm.

The vessel according to the invention may be used to heat up the content in a microwave oven as well as on a stove top or induction cooker due to the microwave-heating plate sandwiched between the inner and outer shells at the bottom of the vessel as shown in FIG. 1.

Another aspect of the invention provides another vessel for microwave oven as shown in FIG. 4.

The vessel for microwave oven comprises a container, a microwave-heating plate, a thermonchromic paint (60), and a pressure release device.

The container has a double-layered structure with an inner shell and an outer shell, and said inner shell and said outer shell are joined by a joint in such a way that a cavity is provided therebetween, and a heat transfer medium is filled to at least part of said cavity.

The microwave-heating plate is disposed between the inner and outer shells for converting microwave to heat, and the microwave-heating plate comprises a MnZn-Ferrite-rubber fuse-compounded thereto.

The thermochromic paint is disposed on an outer surface of the container and configured for showing temperature of inside of the container in terms of color.

The pressure release device is formed at one side of said outer shell.

The microwave-heating plate may further comprise a high tempered glass plate.

The microwave-heating plate may further comprise a ceramic plate.

The microwave-heating plate may be attached to each of the inner and outer shells by a fastening means.

The microwave-heating plate may be inserted between the inner and outer shells by a fastening means.

Each of the inner and outer shells may comprise stainless steel.

The microwave-heating material may comprise a ceramic plate, wherein the ceramic plate has a thickness from about 2 mm to about 10 mm.

The ceramic plate may have a thickness of about 5 mm.

The vessel may be adapted to heat up a content therein in a microwave oven.

The vessel may be adapted to heat up a content therein on a stove top or induction cooker.

The microwave-heating plate may be attached to an outer surface of the outer shell.

The inner and outer shells may be welded seamlessly, rolled, and formed bead-edge structure.

The thermochromic paint may be configured to change the color thereof to red when it is above about 80 degrees in Celsius inside the vessel, yellow when it is between about 60 degrees and about 80 degrees, and blue when it is below about 40 degrees.

The vessel for microwave oven may further comprises a handle formed on one side of said outer shell and a lid having a receiver part forming a concave portion to receive said joint.

The pressure release device may be installed inside a handle on one side of the outer shell and opened when a cavity pressure exceeds a predetermined value, and the pressure release device comprises:

a spring housing defining a spring device hole and a pressure controlling hole connected thereto, wherein the spring housing has a groove around the outer circumference thereof;

a pressure control valve in the spring device hole to block the pressure controlling hole;

a spring placed in the spring housing to bias the pressure control valve against the pressure controlling hole; and a spring suspension member having a through hole and coupled with the spring housing with a step ring being placed in the groove of the spring housing.

The heat transfer medium may be silicon oil.

The pressure release device may be installed inside a handle on one side of the outer shell and comprises a bracket fixedly installed with a fixing part at one side of the handle, and a valve member installed within the bracket, wherein said valve member comprises a body being hollow and cylindrical, a neck, being hollow and cylindrical, with the smallest outer diameter and with its length being the same as the thickness of the outer shell, and a head being tapered forwardly, said neck being inserted into an opening formed on the outer shell.

The vessel for microwave oven may further comprise a silicon rubber plate disposed between the microwave-heating plate and the outer bottom surface of the outer shell.

Referring to FIG. 4, instead of the metal valve as in FIG. 2, the pressure release device (A) may comprise a silicon valve including a pressure valve, a bracket, and a screw.

Figure 5:
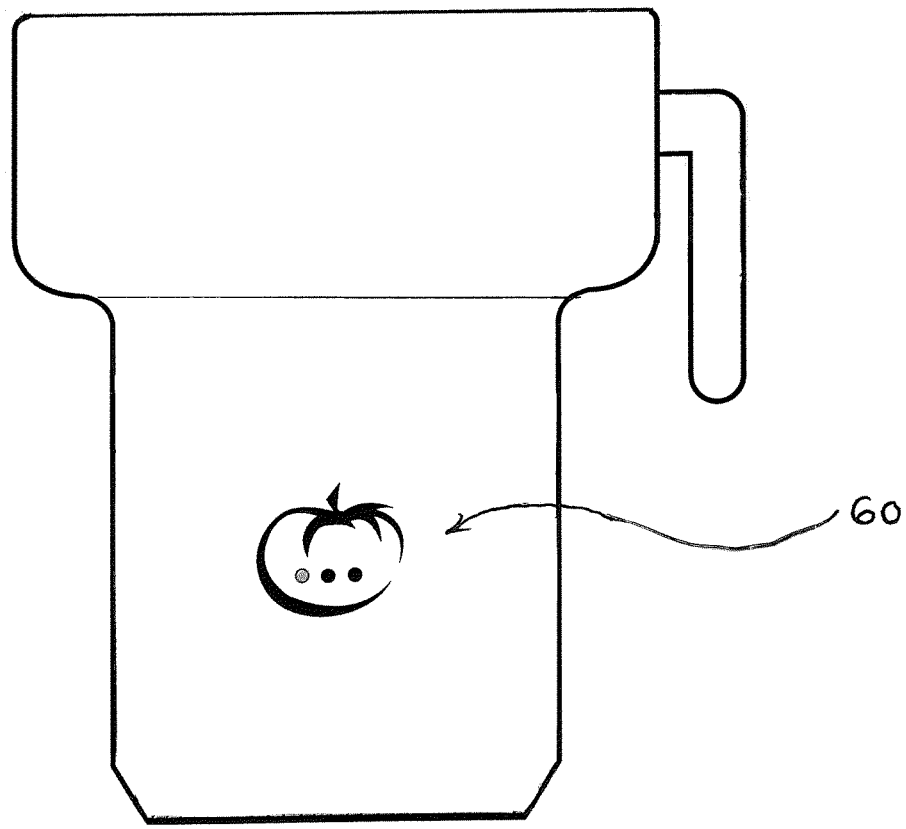
FIG. 5 shows a perspective view of a travel mug with a thermochromic paint according to still another embodiment of the present invention.

Referring to FIG. 5, the thermochromic paint (60) can be provided in a decorating pattern. The three dots are configured to show the temperature of the content in the vessel or the vessel in terms of color or colors.

Figure 6:
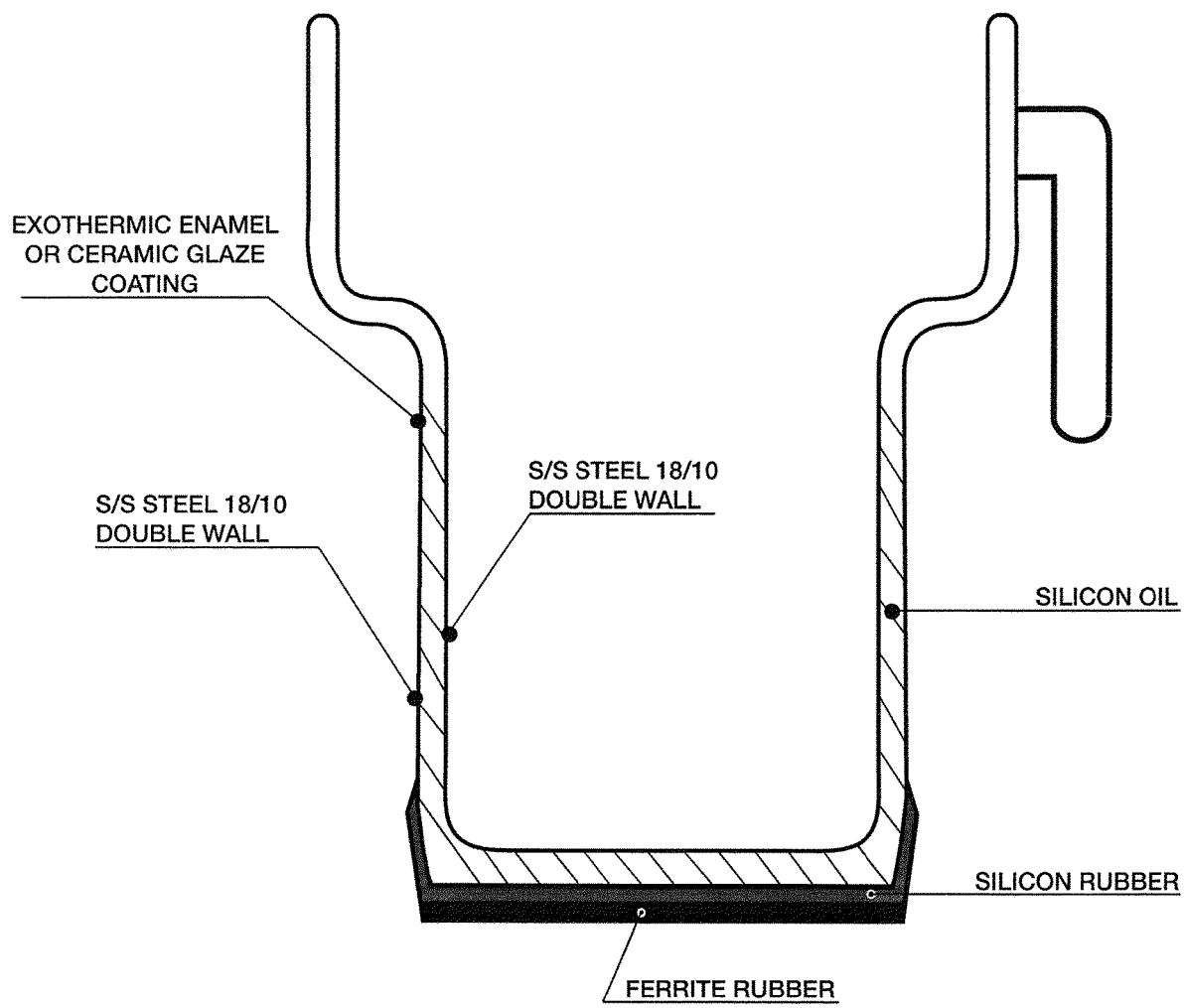
FIG. 6 shows a cross-sectional view of a travel mug for microwave oven according to still another embodiment of the present invention.

In still another embodiment shown in FIG. 6, each of the silicon rubber plate and the microwave-heating plate is disposed all over the bottom portion of the vessel and extends to a lower portion of the side surface of the vessel, preferably about 3 cm of lower side portion, and a coating of exothermic enamel glaze or exothermic ceramic glaze is disposed on the remaining side surface of the vessel.

Figure 7:
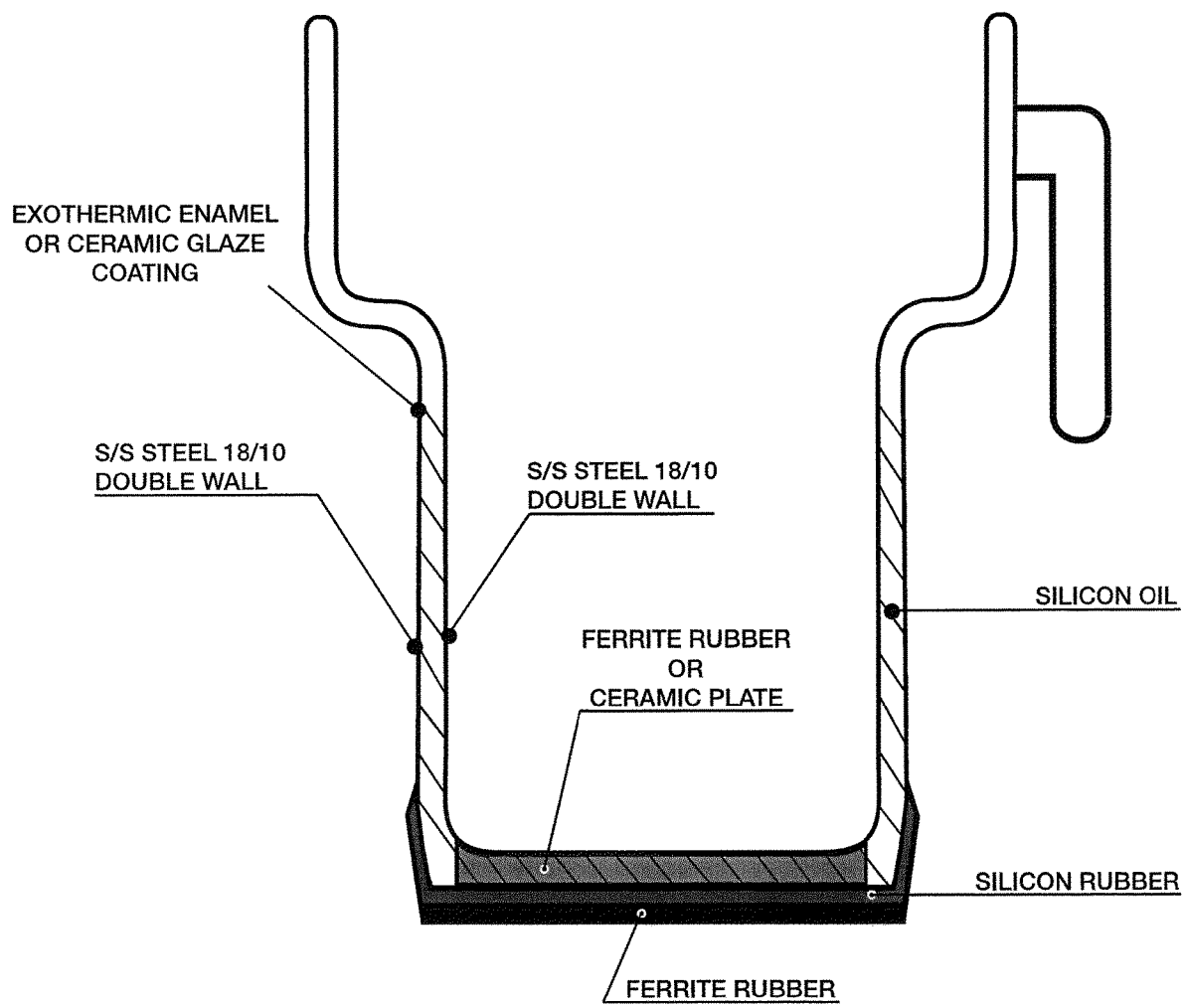
FIG. 7 shows a cross-sectional view of a travel mug for microwave oven according to still another embodiment of the present invention.

In still another embodiment shown in FIG. 7, a layer of mixing of MnZn-Ferrite-rubber and FeSi is disposed between the inner shell and the outer shell across the bottom portion of the vessel.

The vessel for microwave oven according to the embodiment may be configured for a travel mug or a cooking pot, which is not limited, either.

The embodiments of the present invention described above are only for examples, but the present invention is not limited to these embodiments. Various other changes and modifications can be made without departing from the spirit and scope of the invention. The present invention is not limited by the description described above, but only limited by the scope of the claims attached herewith.

What is claimed is:

1. An apparatus for a microwave oven, comprising:
    a travel mug having a double-layered structure with an inner shell and an outer shell, wherein said inner shell and said outer shell are joined by a joint in such a way that a cavity is provided therebetween;
    a heat transfer medium in said cavity;
    a silicon rubber plate attached to an outer bottom surface of the outer shell; a ferrite rubber plate attached to a bottom of the silicone rubber plate, wherein each of the silicon rubber plate and the ferrite rubber plate comprises a MnZn-Ferrite-rubber fuse-compounded thereto for converting microwaves to heat;
    a ceramic heating plate inserted along a bottom of the cavity in between the inner and outer shells;
    a coat of exothermic ceramic glaze coated on at least a portion of an outer surface of the outer shell, the outer surface comprising a thermochroic paint coated on the exothermic ceramic glaze coating of the outer surface of the travel mug, wherein the thermochromic paint is configured to change color thereof to red when temperature is above 80 degrees in Celsius inside the travel mug, yellow when it temperature is between 60 degrees and 80 degrees, and blue when temperature is below 40 degrees;
    and a pressure release device installed on a side of the outer shell that is not coated to discharge excess pressure in the cavity when the travel mug is heated.

2. The apparatus for microwave oven of claim 1, wherein each of the inner and outer shells is made with stainless steel.

3. The apparatus for microwave oven of claim 1, wherein the ceramic heating plate has a thickness from about 2 mm to about 10 mm, or about 5 mm.

4. The apparatus for microwave oven of claim 1, wherein the inner and outer shells are welded seamlessly, rolled, and formed bead-edge structure.

5. The apparatus for microwave oven of claim 1, further comprising: a handle formed on the side of the outer shell; and
    a lid having a receiver part forming a concave portion to sit on the joint.

6. The apparatus for microwave oven of claim 1, wherein the heat transfer medium is silicon oil.

7. The apparatus for microwave oven of claim 6, wherein the pressure release device is installed inside a handle on one side of the outer shell, wherein the pressure release device comprising:
    a bracket fixedly installed with a fixing part at one side of the handle, and a valve member installed within the bracket, wherein said valve member comprises (i) a body being hollow and cylindrical, (ii) a neck, being hollow and cylindrical, with the smallest outer diameter and with length being the same as the thickness of the outer shell, and (iii) a head being tapered forwardly, said neck being inserted into an opening formed on the outer shell.

8. The apparatus for microwave oven of claim 1, wherein the pressure release device is installed inside a handle on the side of the outer shell and opened when a cavity pressure exceeds a predetermined value, and wherein the pressure release device comprises:
    a spring housing defining a spring device hole and a pressure controlling hole connected thereto, wherein the spring housing has a groove around an outer circumference thereof;
    a pressure control valve in the spring device hole to block the pressure controlling hole; a spring placed in the spring housing to push the pressure control valve against the pressure controlling hole; and
    a spring suspension member having a through hole and coupled with the spring housing with a step ring being placed in the groove of the spring housing.

9. The apparatus for microwave oven of claim 1, wherein a layer of mixing of MnZn-Ferrite-rubber and FeSi is disposed in the bottom of the cavity in between the inner shell and the outer shell.

* * * * *